Aug. 6, 1929.  S. J. BENS  1,723,125
POWER DRIVEN CHAIN SAW ASSEMBLY
Filed Jan. 26, 1927  5 Sheets-Sheet 1
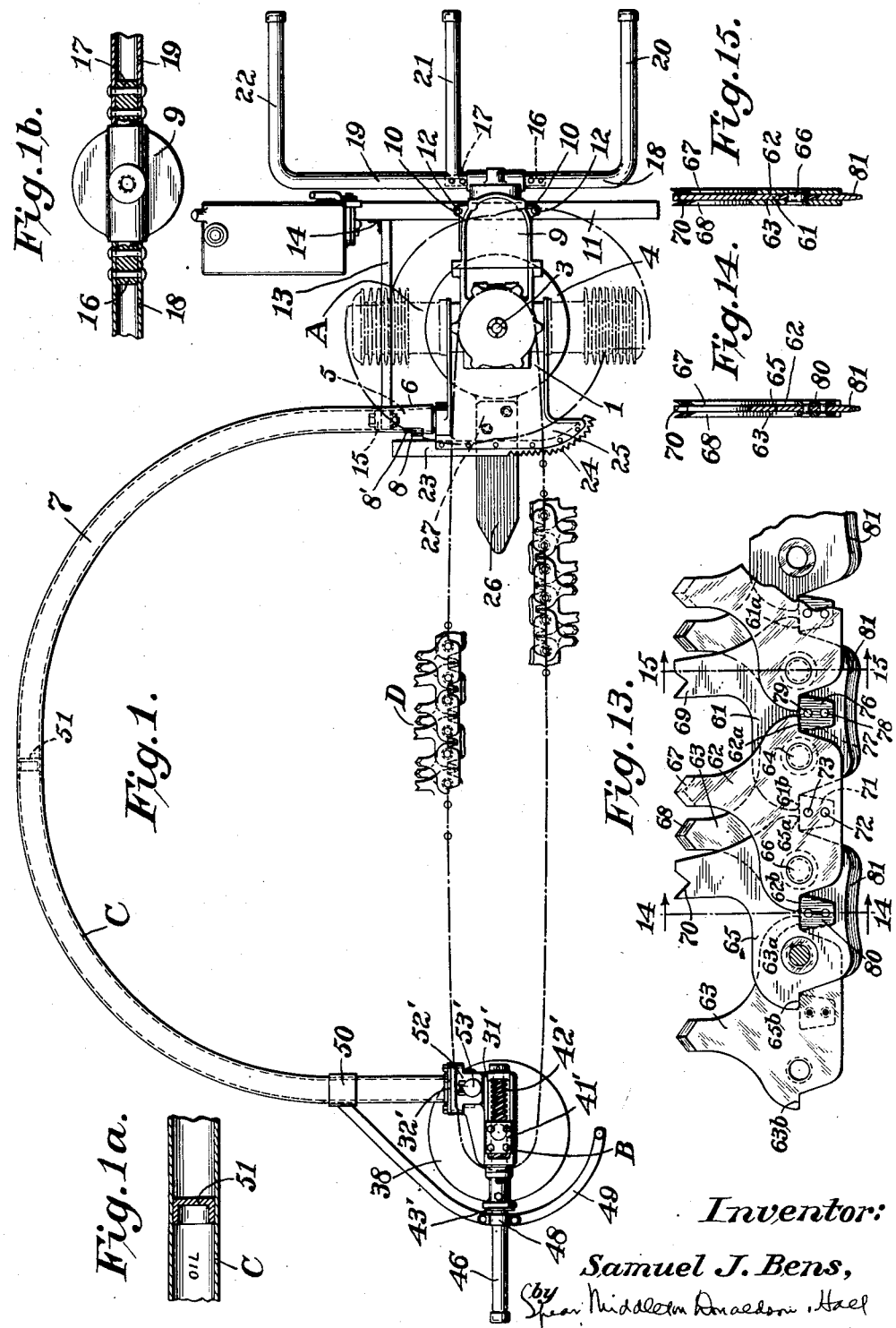
Inventor:
Samuel J. Bens,
Attys.

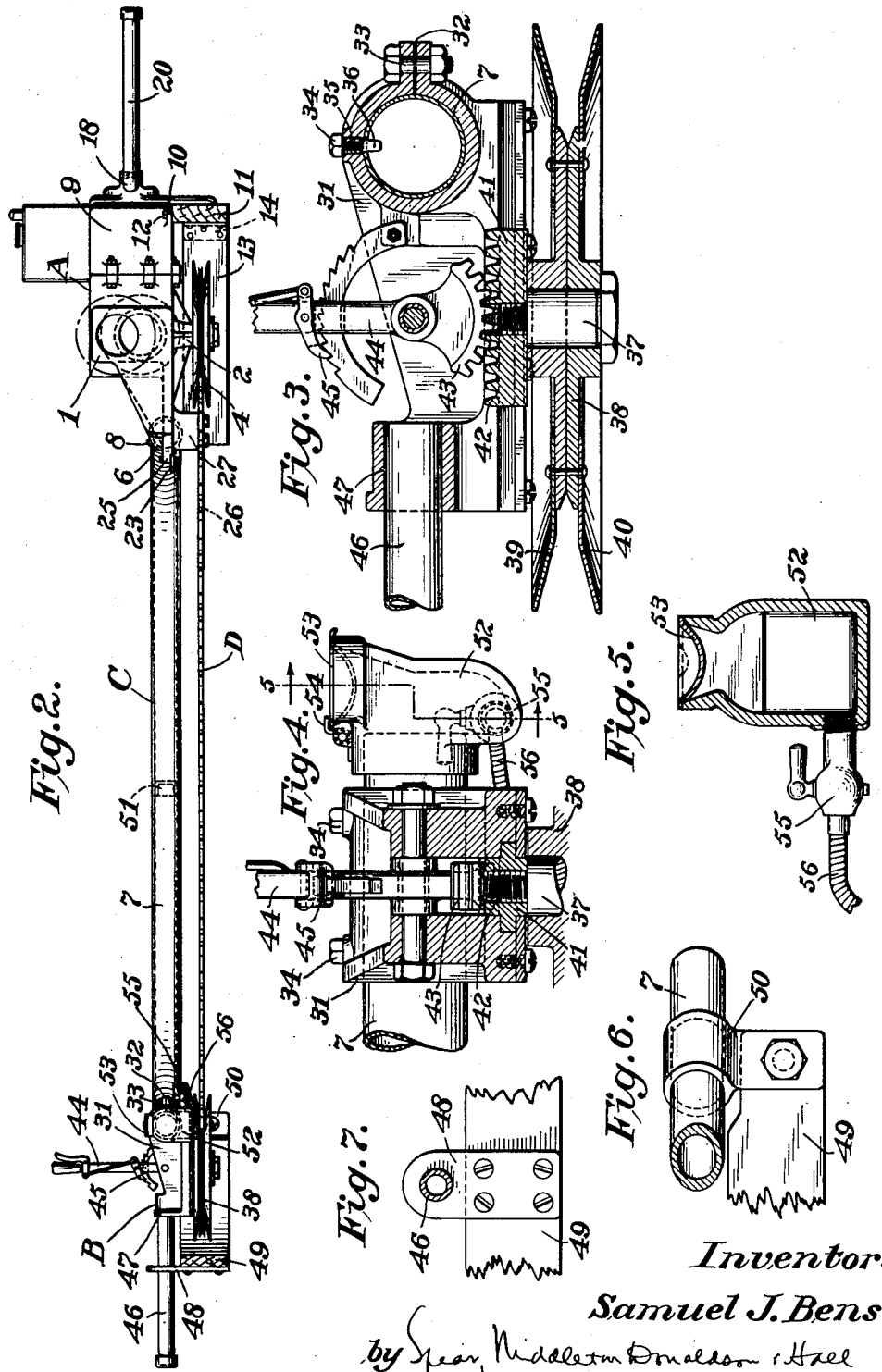

Aug. 6, 1929.      S. J. BENS      1,723,125
POWER DRIVEN CHAIN SAW ASSEMBLY
Filed Jan. 26, 1927      5 Sheets-Sheet 3
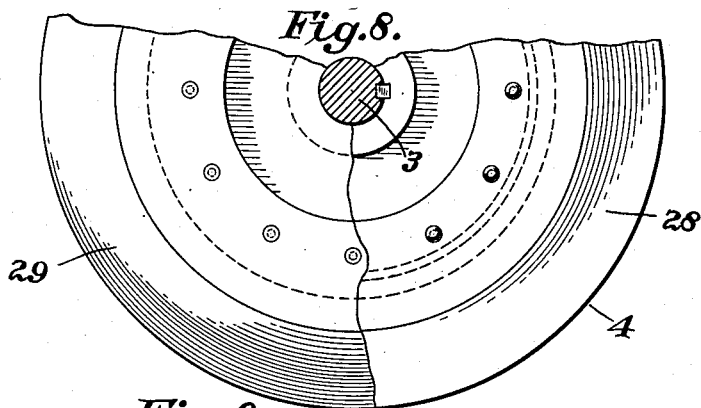
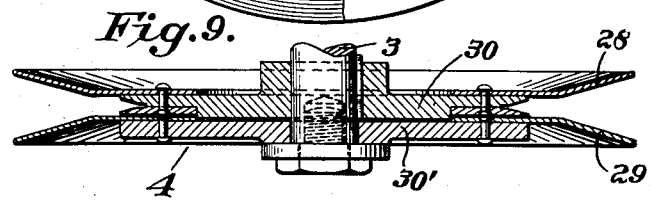
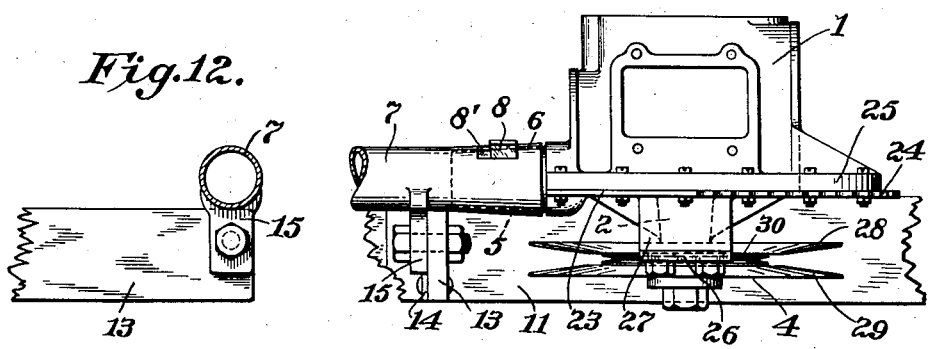
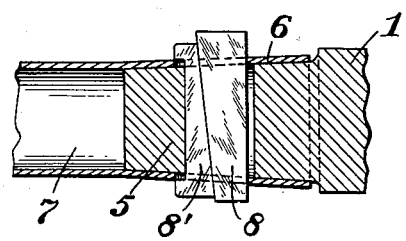
Inventor:
Samuel J. Bens,
by Spear, Middleton Donaldson, Hall
Attys.

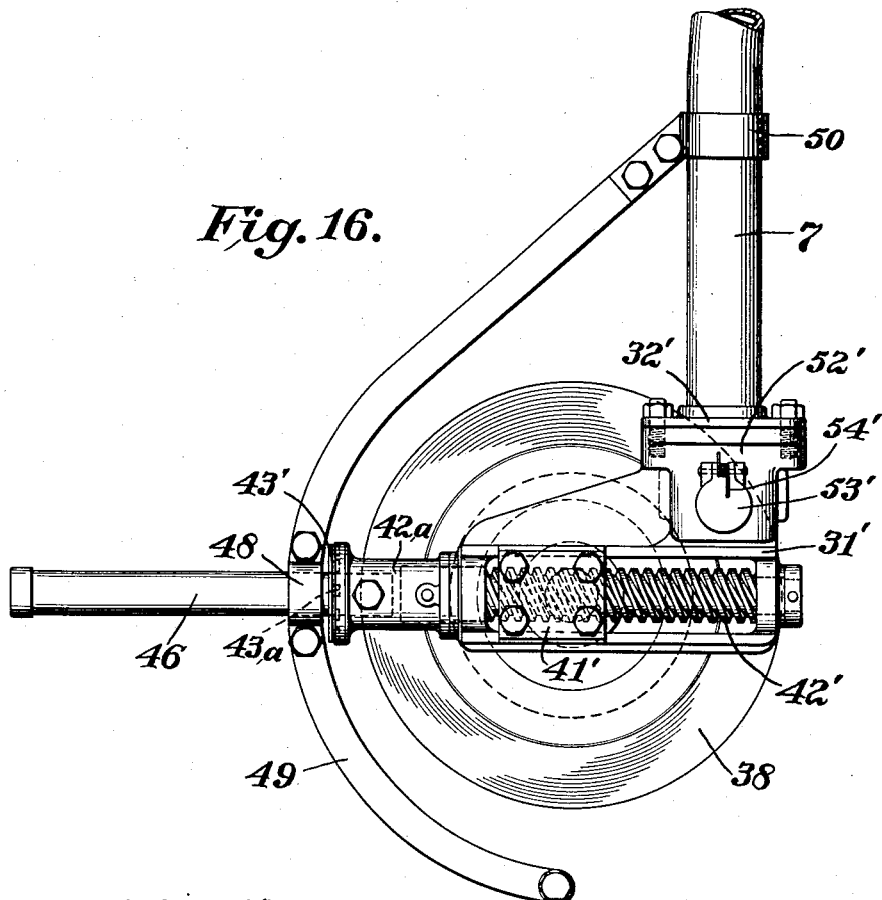
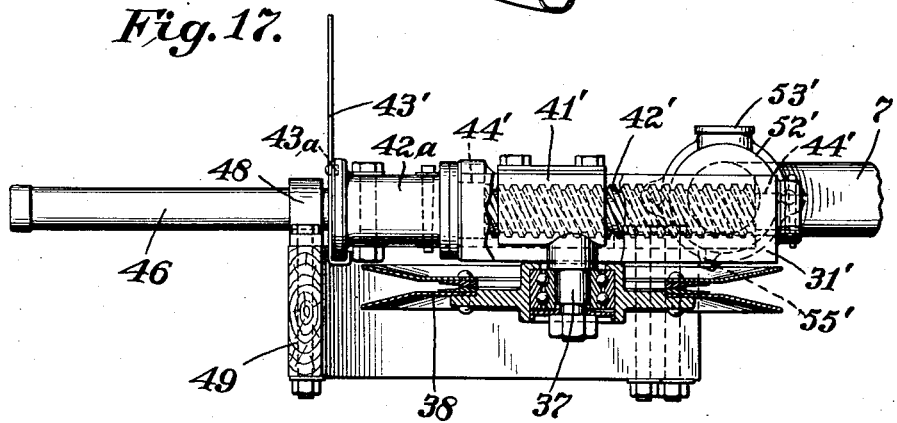

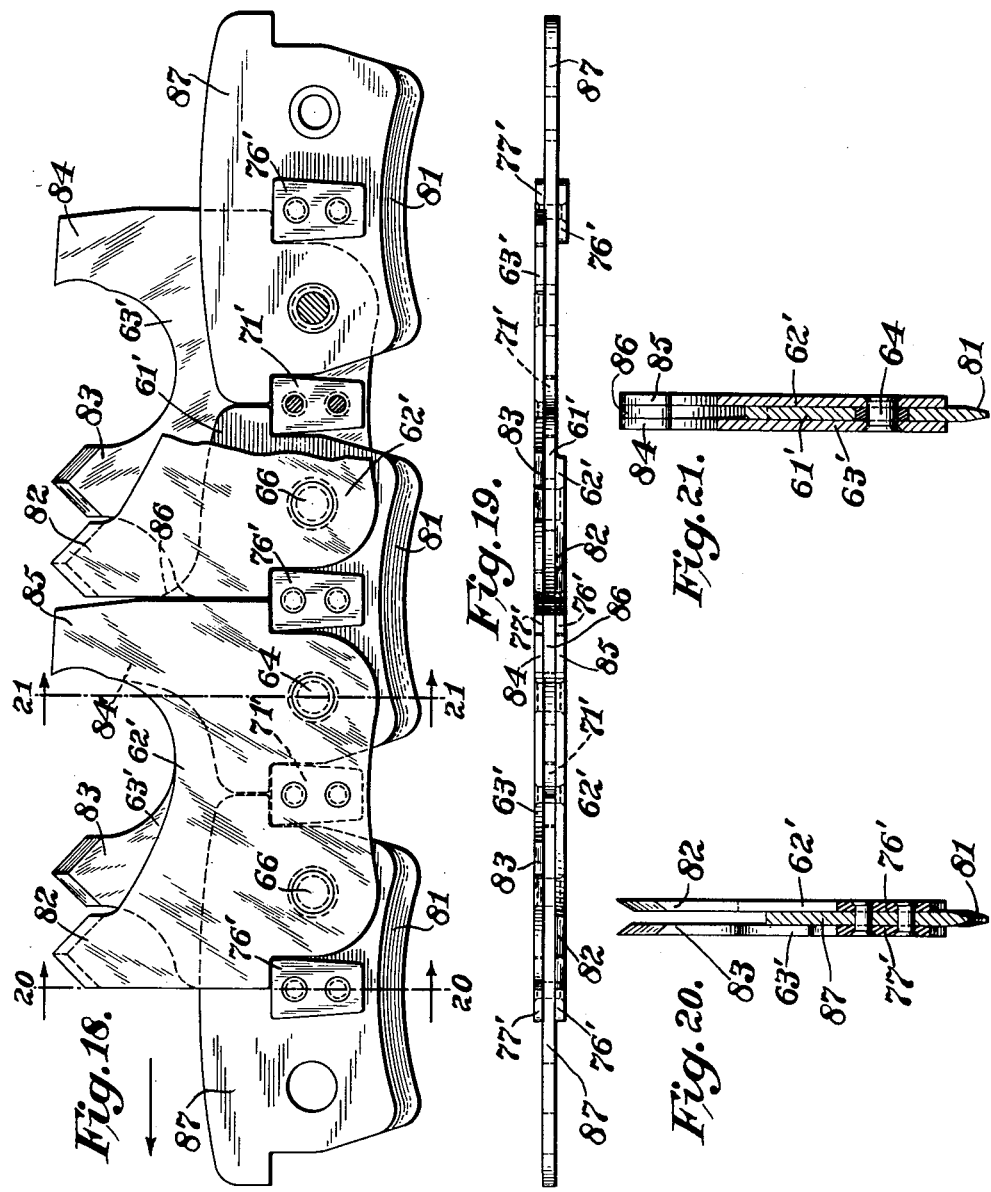

Patented Aug. 6, 1929.

1,723,125

UNITED STATES PATENT OFFICE.

SAMUEL J. BENS, OF NEW YORK, N. Y., ASSIGNOR TO CHAIN SAW CORPORATION, A CORPORATION OF DELAWARE.

POWER-DRIVEN CHAIN-SAW ASSEMBLY.

Application filed January 26, 1927. Serial No. 163,719.

This invention relates to a power driven chain saw and associated parts which may be used to fell standing trees or to saw the cut trees into logs, the saw being capable of efficient use at any angle between the horizontal and the vertical.

The principal object of the invention is the provision of an assembly as above which will be efficient in operation, which will be extremely portable and conveniently compact.

To this end the invention includes a power assembly or unit which comprises an internal combustion motor of a suitable type which drives a sheave which operates the saw of the chain or link type. The opposite end of the chain is carried by an idler unit including an idler sheave, the idler unit and power unit being connected together by means of a frame detachably connected to the units but secured in a rigid manner. The frame is adapted to straddle the tree trunk as the saw progresses through the tree.

The invention further consists in the combination, construction and arrangement of parts hereinafter described and shown in the accompanying drawings.

I have illustrated one form of my invention in the accompanying drawings which show the details of the various parts making up the units, the frame and the saw proper.

In these drawings:—

Figure 1 is a plan view of a saw assembly.

Fig. 1ª is a detail of the oil chamber partition.

Fig. 1ᵇ is a detail of the handle attaching means.

Fig. 2 is a front elevation of a saw assembly with a modified idler adjustment.

Fig. 3 is an enlarged sectional view through the idler unit of Fig. 2.

Fig. 4 is a side elevation partly in section at right angles to the view of Fig. 3.

Fig. 5 is an enlarged detail of the lubricant filling fixture.

Fig. 6 is a detail of the guard support at the idler end of the frame.

Fig. 7 is a detail of the fixtures used to hang the guard from the handle.

Fig. 8 is a fragmentary plan view of the drive sheave.

Fig. 9 is a sectional elevation of the drive sheave.

Fig. 10 is an enlarged elevation of the power unit looking along the longitudinal axis of the kerf blade.

Fig. 11 is a detail of the means of attaching the frame to the power unit.

Fig. 12 is a detail of the supporting means for the guard.

Fig. 13 is a partial front view of the chain saw.

Fig. 14 is a sectional elevation along the line 14—14 of Fig. 13.

Fig. 15 is a sectional elevation along the line 15—15 of Fig. 13.

Fig. 16 is an enlarged detail plan view of the preferred idler adjustment shown in Fig. 1.

Fig. 17 is an elevation of Fig. 16.

Fig. 18 is an enlarged front view of the preferred form of chain saw.

Fig. 19 is a side elevation of Fig. 18.

Fig. 20 is a transverse section on line 20—20 of Fig. 18, and

Fig. 21 is a similar section on line 21—21 of Fig. 18.

Referring now to the embodiment illustrated, I have indicated the power unit generally at A, the idler unit at B, the frame connecting these two parts at C, and the chain saw proper at D.

The power unit may consist of an engine block 1 of a construction which will depend upon the type of internal combustion engine used to furnish power. I have illustrated this engine and power unit merely diagrammatically.

In my experiments I have determined that the casting or cylinder block 1 may advantageously be used as a supporting part; that is, the entire assembly of the power unit may be secured to this cylinder block or casting 1 as a base.

The casting 1 is provided at its lower extremity with an extension 2 having a bore therein which forms a bearing for the crank shaft 3 of the engine to which is fixed the drive sheave 4.

At one end of the casting 1 I provide an extension plug 5 of substantially frustoconical configuration adapted to receive the similarly shaped end 6 of the frame 7. Both frame end 6 and the plug 5 are slotted, the latter to a greater extent than the former, so as to receive taper pin 8 and its complementary part 8', the taper pin 8 being capable of being wedged into the slot to hold the frame securely to the power unit.

Also secured to the casting 1 is a complementary casting 9 used in this connection to house a part of the engine mechanism, which casting is provided with ears 10 adapted to overlie a guard bar 11 and be secured thereto as by means of bolts 12. A steadying brace 13 is provided, secured to the guard bar 11 as by angle iron 14, the other end of the brace being hung from the frame 7 as by means of the part 15 secured in any desired manner to the frame 7.

The complementary casting 9 is provided with two cylindrically shaped extensions 16 and 17, the former being adapted to plug into the hollow handle bar 18 and the latter the hollow handle bar 19.

It is to be noted that the handle bar 18 contains a single handle 20, while the handle bar 19 contains the handles 21 and 22 for a purpose to be more fully described hereinafter.

It is to be noted that the guard bar 11 occupies a position on a level with the drive sheave 4, so that if for any reason the chain saw should break, the loose end of the chain, in being carried around the drive shaft, would some in contact with the guard bar 11 and would not injure the operator holding the handles 20, 21 or 22.

In order to assist the operator in getting the saw properly started into the tree, I provide a knife blade 23 having a sharpened edge and a curved serrated end 24, this blade occupying a position substantially parallel with the plane of the saw. It is to be noted that the serrated edge 24 of the knife blade projects beyond the cutting run of the saw and engages the side of the tree prior to the saw itself. Such being the case, the serrated edge 24 bites into the bark or wood of the tree and steadies the whole assembly as it is moved toward the tree and until the saw begins to make a kerf. As the saw progresses through the tree it will be apparent that the sharpened edge 23 continues along the side of the tree and assists in supporting the saw. At the same time it is to be noted that that part of the chain saw first engaging the tree travels in a direction toward the power unit, which has the effect of pulling the unit toward the tree. This action is resisted by the knife member 23, which, being secured to an extension 25 of the casting 1, guards the engine parts from injury, which might result due to the pulling strain.

In order to additionally support the power end of the saw, which is the heavier portion, while the saw is passing through the tree, I provide a kerf blade 26 secured to an extension 27 of the casting 1. The kerf blade 26 occupies a position between the two runs of the saw and in the same plane therewith. It is to be noted that this blade projects a considerable distance beyond the edge of the blade 23, so that the entire amount of this projection rides in the kerf cut by the advanced run of the saw and in resting upon the stump of the tree takes the weight of the saw from the operators.

The drive sheave consists of two complementary dished annuluses 28 and 29 spaced apart by means of spacing members 30 and 30', which also serves to take up any vibration and maintain the parts in a rigid manner. The annulus 28 is fixed definitely to the crank shaft 3 and rotates with it at all times while the lower annulus 29 is loose upon the same shaft. The spacing members are provided with a peripheral tapered groove adapted to receive a similar taper on the links comprising the chain saw. The saw links frictionally engage this drive sheave and the saw is moved by reason of this gripping action.

It will be noted that the spacing members 30 and 30' are spaced slightly from each other so that when the links comprising the chain saw are not wedged between these two parts, the top annulus 28 will rotate freely, while the chain will lie upon the lower annulus 29 and these latter parts will be without movement. Means will be described hereinafter for wedging the links of the chain into and out of engagement with the parts 30 and 30'.

The frame in the form illustrated consists of a tubular arc of sufficient extent to straddle the trees desired to be felled, and obviously the size and extent of this frame will be determined by the relative size of the trees in the neighborhood in which the saw is to be operated.

In the idler unit B I provide a casting 31 provided with a socket adapted to receive the end of the frame 7. The casting 31 is preferably split as at 32, which split may be taken up by the bolts 33. In order to locate the frame in the proper relation to the idler unit B, so that the plane of its idler sheave will lie in the plane of the drive sheave, I provide a locating pin 34 which is provided with a threaded portion 35 screwed into the casting 31, one end of the locating pin 34 being unthreaded and slightly tapered as at 36. This tapered end 36 projects through a hole in the frame 7 beneath the threaded aperture in the casting 31, so that the proper location of the casting on the frame may be instantly located and accurately maintained. I provide a pair of these locating pins 34; as shown.

The casting 31 is provided with a stub shaft 37, which shaft carries the idler sheave 38. This sheave rotates freely on the stub shaft 37 and consists of the upper annulus 39 and the lower annulus 40 with spacing members therebetween, the spacing members being provided with a tapered peripheral groove in order to receive the similarly tapered edges of the links of the chain saw.

Suitable means are provided for moving the idler sheave toward and away from the drive sheave in order to loosen and tighten the chain saw respectively. This mechanism may conveniently consist of a sliding block 41 which carries the stub shaft and which moves in the casting 31. This block 41 may be provided with a rack 42 and a segment 43 having a handle 44 and locking means 45. It will be apparent that by manipulation of the handle 44 through the instrumentalities of the rack and segment, slight movement may be given to the idler sheave in order to tighten or loosen the chain saw and the parts may be locked in this position by means of the locking means 45. Obviously when the handle 44 is moved to the right, the chain saw is tightened, with the result that the saw D enters between the spacing parts 30 and 30' of the drive sheave, which to all intents and purposes locks these two parts together, and the chain will move, driven by the sheave 4. Opposite movement of the handle 44 will loosen the chain and release it from between the rotating part 30 and the loose part 30' of the drive sheave, with the result that the chain remains stationary, even though the upper half of the drive sheave continues to rotate.

In the idler unit shown in Figs. 16 and 17, I provide a casting 31' adapted to have the fixture 32', which is secured to the end of the frame 7, fastened thereto by means of bolts in the usual manner. These bolts constitute locating members to ensure the plane of the idler sheave being in the plane of the saw D and drive sheave.

In this form of idler adjustment mechanism the casting 31' is provided with a sliding block 41' which is internally threaded to receive the coarse threaded adjustment shaft 42', the end of which extends beyond the casting 31', and has fixed thereon a suitable sleeve 42ª provided with a flange in which are arranged holes to receive a pin 43ª carried on the adjusting handle 43'. This handle 43' is arranged on this projecting end, loosely, so that movement in one direction or the other will rotate the shaft 42' and consequently move the block 41', in order to cause the pulleys or sheaves to separate or approach each other, to tighten or loosen the saw as may be needed. Unthreaded portions 44' are provided on the adjustment shaft 42' which serve as bearings so that this shaft is in itself stationary, although free to rotate. In any position of the shaft 42', the idler sheave is locked against movement.

In order to thoroughly lubricate both sheaves and chain saw, I make use of the hollow interior of the frame 7 as a lubricant chamber. Before the frame is assembled in place I introduced therein a partition 51 in order to keep the lubricant from passing over to the other side of the frame. The end of the frame which passes through the casting 31 shown in Figs. 2, 3 and 4 is provided with a fixture 52 having a filling gate 53 normally closed by the spring 54 and through which lubricant may be introduced into this portion of the frame. The fixture 52 is provided with an outlet 55 which terminates in a lubricant nozzle 56 as indicated.

In Figs. 16 and 17 the casting 31' adjacent the end of the hollow frame 7 is provided with a lubricant fixture 52' communicating with the interior of frame 7. This chamber is provided with a filling gate 53', normally closed by a spring 54'. The lubricant reservoir is filled through this opening.

An outlet 55' allows the lubricant to drip directly upon the saw D as it enters the idler sheave, and before the individual links begin to move about their pivots. Upon such movement, the lubricant works down between the links and the pivots and thoroughly lubricates the same.

A handle 46 is provided, suspended as at 47, from which handle may be hung by the part 48 a curved guard bar 49 to which is attached a slide 50 encircling the frame 7. It is to be noted that the guard bar 49 also lies in the plane of the idler sheave so that in case of breakage of the chain saw, the loose end in travelling around the sheave will come in contact with the bar and not injure the operator grasping the handle 46.

By backing off the nuts holding the fixture 32', the entire idler unit may be swung around to the inside of the frame 7 for transportation purposes, which makes the device compact.

If for any reason it is necessary to replace the power unit, all that is necessary is to knock out the pin 8, whereupon the frame 7 may be removed from the plug 5 and the frame and power unit are thus separated.

As the control of the engine will be had from the power end, and as the skilled operator will be at this end, it is desirable to provide the two handles 20 and 21 for his use and the extra handle 22 may be grasped by an additional workman to assist the head operator in supporting the saw. For light work the operator may handle the saw from handles 20 and 21 alone, from 21 and 22 alone, or from 20 and 22, as may be convenient to him.

The chain D which I have found to be advantageous in using the saw may consist of a link 61 having one of its ends held between the overlapping ends of links 62 and 63 as by pivot pins 64. A link 65 similar to link 61 is likewise held by a rivet 66 between the opposite ends of links 62 and 63.

The links 62 and 63 are provided with cutting teeth 67 and 68 respectively and links 61 and 65 with drag or clearer teeth 69 and 70 respectively for removing the sawdust from the kerf.

Each of the links is provided at opposite ends with a shoulder such as shown at 61<sup>a</sup> and 61<sup>b</sup> on link 61, 62<sup>a</sup> and 62<sup>b</sup> on link 62, 63<sup>a</sup> and 63<sup>b</sup> on link 63, and 65<sup>a</sup> and 65<sup>b</sup> on link 65.

Links 62 and 63 hold between themselves a stop 71, rivets or other fastening members 72 and 73 passing through link 62, stop 71 and link 63 and holding these three members together. Shoulders 61<sup>b</sup> and 65<sup>a</sup> of links 61 and 65 are adapted to engage this stop 71. Each set of links is provided with similar stops, which function in the same manner.

Link 61 is provided with a set of stops 76 and 77 secured to each side thereof as by rivets 78 and 79. In like manner link 65 is provided with a similar pair of stops, one of which is indicated at 80. It will be seen, therefore, that link 62 has its shoulders supported upon and engaging stops 76 and 80, while the shoulders of link 63 engage the stops on the opposite side of links 61 and 65.

The preferred form of chain saw is shown in Figs. 18 to 21 inclusive, and consists of a pair of cutter links 62′ and 63′ holding between their ends in a pivotal manner, a spacer link 61′.

The end of each link terminates in a shoulder adapted to seat upon a stop secured to its neighboring link. Cutter links 62′ and 63′ have a stop 71′ riveted between them and upon which the shoulders of the enclosed ends of the spacer links engage and rest. Likewise, stops 76′ and 77′ are riveted on each side of spacer link 61′ upon which end shoulders of cutter links 62′ and 63′ engage and rest. Each link and set of links is provided with similar stops which function in the same manner.

Cutter link 62′ is provided with a cutting tooth 82, and link 63′ with a cutting tooth 83, staggered with regard to each other. The opposite end of each of these links is provided with a clearer tooth 84 and 85 respectively, coinciding with each other. Spacer link 61′ is likewise provided with a clearer tooth 86 coinciding with clearer teeth 84 and 85, so that while the cutting teeth are spaced apart a distance equal to the thickness of the spacer link 61′, and cut a kerf of corresponding width, yet the composite clearer tooth is of the full width of the kerf which ensures positive removal of all sawdust and refuse.

It may not be desirable in all instances to provide each spacer link with a clearer tooth, and in such cases I use a spacer link as at 87 without teeth at all, but in every other respect a duplicate of spacer link 61′.

It is to be noted that in all cases the stops are so shaped as to snugly fit the corner formed by the juncture of the shoulder and body of the respective links, so that longitudinal spread or compression of the cutting run of the saw is prevented. In this way an arc-shaped run is maintained and no wear or strain of the pivots will lessen or straighten out this arc, due to the above mentioned cooperation between shoulders and stops.

All spacer links are provided with bevelled portions 81 adapted to frictionally engage the similarly shaped groove in the driving sheave.

Obviously the individual links may move to a limited extent in one direction about their common pivots, as when travelling around a sheave, but movement in the other direction is limited by the stops engaging the link shoulders.

Due to the fact that the links are entirely held on stops, no wear occurs at the rivets and hence no stretch or breaking of the arc occurs.

I claim:

1. A power driven chain saw assembly, including a power unit having a drive sheave, an idler unit having an idler sheave, an open frame joining the two units and forming the only connection between the units, an endless chain saw passing around the two sheaves and directly between the units, said power unit having a knife blade secured thereto and adapted to bite into the bark of the tree and resist the pull of the saw blade, and a kerf blade adapted to enter the kerf cut by the saw and follow the saw through the tree to support the saw.

2. A power driven chain saw assembly, including a power unit having a drive sheave, an idler unit having an idler sheave, an open frame joining the two units and forming the only connection between the units, an endless chain saw passing around the two sheaves and directly beneath the units, said power unit having a serrated knife blade attached thereto and adapted to buck the tree and projecting beyond the cutting run of the saw, and a kerf blade extending between the runs of the saw and adapted to follow the saw blade through the kerf.

3. A power driven chain saw assembly, including a power unit having a drive sheave, an idler unit having an idler sheave, a tubular frame joining the two units and forming the only connection between the units, an endless chain saw passing directly around the two sheaves and out of contact with said frame, said frame being hollow, and means to fill said frame with a lubricant and to feed the same therefrom to the idler sheave.

4. A power driven chain saw assembly, including a power unit having a drive sheave, an idler unit having an idler sheave, a frame joining the two units and forming the only connection between the units, an endless chain saw passing directly around the two sheaves, said frame being hollow and constituting a unitary oil reservoir, and an oil feed and oil filling fixture at the end of the frame to feed lubricant to the idler sheave.

5. A power driven chain saw assembly, including a power unit having a drive sheave, an idler unit having an idler sheave, an arch-shaped frame joining the two units, one of said units being normally on the outside of said arch, an endless chain saw passing around the two sheaves, said unit being rotatable about said frame to a position inside the arch.

6. A power driven chain saw assembly, including a power unit having a drive sheave, an idler unit having an idler sheave, an arch-shaped frame joining the two units, one of said units being normally on the outside of said arch, an endless chain saw passing around the two sheaves, one of said units being rotatable about said frame to a position within the arch, and locating pins to lock said unit against such rotation.

7. In a portable power saw of the class described, a traveling chain saw mounted on pulleys, forward handles for supporting the forward end of the saw, a rearward handle for supporting the rear end of the saw, said rearward handle having means whereby said rearward handle co-acts with one of said pulleys for tensioning the chain saw between said pulleys.

8. In a portable power saw of the class described, a traveling chain saw mounted on forward and rearward pulleys, forward handles for supporting the forward end of the chain saw, a rearward handle for supporting the rearward end of the chain saw, said rearward handle having internal threaded means engageable with a threaded supporting means on said rearward pulley, whereby the tension in said chain saw may be adjusted by operating said rearward handle.

In testimony whereof I affix my signature.

SAMUEL J. BENS.